(12) United States Patent
Partain et al.

(10) Patent No.: US 7,884,438 B2
(45) Date of Patent: Feb. 8, 2011

(54) MEGAVOLTAGE IMAGING WITH A PHOTOCONDUCTOR BASED SENSOR

(75) Inventors: Larry Dean Partain, Los Altos, CA (US); George Zentai, Mountain View, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 249 days.

(21) Appl. No.: 11/193,162

(22) Filed: Jul. 29, 2005

(65) Prior Publication Data

US 2007/0023853 A1   Feb. 1, 2007

(51) Int. Cl.
*H01L 27/146* (2006.01)

(52) U.S. Cl. .................. 257/443; 257/72; 257/428; 257/431; 257/444; 257/448; 257/E31.086; 257/E31.092; 250/370.09

(58) Field of Classification Search ............. 257/443, 257/444, E31.124, 72, 428, 431, 448, E31.086, 257/E31.092; 430/57.1, 127, 128; 250/370.09
See application file for complete search history.

(56) References Cited

U.S. PATENT DOCUMENTS

| | | | | |
|---|---|---|---|---|
| 4,577,108 | A * | 3/1986 | Diepers et al. | 250/370.09 |
| 5,262,649 | A * | 11/1993 | Antonuk et al. | 250/370.09 |
| 5,648,660 | A * | 7/1997 | Lee et al. | 250/370.09 |
| 5,686,733 | A * | 11/1997 | Fallone et al. | 250/591 |
| 5,962,856 | A * | 10/1999 | Zhao et al. | 250/370.09 |
| 6,021,173 | A * | 2/2000 | Brauers et al. | 378/98.8 |
| 6,025,599 | A * | 2/2000 | Lee et al. | 250/370.09 |
| 6,080,997 | A * | 6/2000 | Tashiro et al. | 257/28 |
| 6,124,606 | A * | 9/2000 | den Boer et al. | 257/291 |
| 6,635,860 | B2 * | 10/2003 | Sato et al. | 250/214.1 |

OTHER PUBLICATIONS

Su et al., "Systematic investigation of the signal properties of polycrystalline HgI2 detectors under mammographic, radiographic, fluoroscopic and radiotherapy irradiation conditions", Physics in Medicine and Biology 50 (2005) pp. 2907-2928.*

Zhong Su et al., Systematic Investigation of the Signal Properties of Polycrystalline HgI Detectors under Mammographic, Radiographic, Fluoroscopic and Radiotherapy Irradiation Conditions, Physics in Medicine and Biology, 2005, Phys. Med. Biol. 50 (2005) pp. 2907-2928, Institute of Physics Publishing, United Kingdom.

* cited by examiner

*Primary Examiner*—Kenneth A Parker
*Assistant Examiner*—Jay C Kim
(74) *Attorney, Agent, or Firm*—Blakely, Sokoloff, Taylor & Zafman LLP

(57) ABSTRACT

A photodetector for detecting megavoltage (MV) radiation comprises a semiconductor conversion layer having a first surface and a second surface disposed opposite the first surface, a first electrode coupled to the first surface, a second electrode coupled to the second surface, and a low density substrate including a detector array coupled to the second electrode opposite the semiconductor conversion layer. The photodetector includes a sufficient thickness of a high density material to create a sufficient number of photoelectrons from incident MV radiation, so that the photoelectrons can be received by the conversion layer and converted to a sufficient of recharge carriers for detection by the detector array.

26 Claims, 8 Drawing Sheets

MEGAVOLTAGE IMAGING WITH A PHOTOCONDUCTOR BASED SENSOR

STATEMENT REGARDING FEDERALLY SPONSORED RESEARCH OR DEVELOPMENT

This invention is made with Government support under Subcontract No. 4300039024-BWXT Y-12; Contract No. DE-AC05-00OR22800 awarded by the Department of Energy. The Government has certain rights in this invention.

FIELD

Embodiments of the present invention are generally related to the field of photodetectors and more specifically related to a photoconductor based megavoltage radiation sensor.

BACKGROUND

Detectors may be fabricated in many ways, and may serve many purposes. For all detectors, sensitivity and signal-to-noise ratios are important to successful operation. Radiation photodetectors can be constructed with photoconductor sensors. When attempting to detect x-rays, photodetectors are preferably highly sensitive to x-rays and relatively insensitive to other electromagnetic radiation. The photoconductors can either be intrinsic semiconductor materials that have high resistivity unless illuminated by X-ray photons, or diode structures that have small currents due to the blocking effect of the diode junction unless illuminated with X-rays.

FIG. 1A illustrates one type of conventional photodetector 50 that includes a semiconductor material with a pair of contact electrodes on either side of the semiconductor material. The semiconductor material acts as a direct conversion layer to convert incident radiation to electric currents. A voltage source connected to the electrodes applies a positive bias voltage across the semiconductor material, and current is observed as an indication of the magnitude of incident radiation. When no radiation is present, the resistance of the semiconductor material is high for most photoconductors, and only a small dark current can be measured. When radiation is made incident through the top contact electrode upon the semiconductor material, electron-hole pairs form and drift apart under the influence of a voltage across that region. Electrons are drawn toward the more positively (+) biased contact electrode and holes are drawn toward the more negatively biased (e.g., quasi-grounded) contact electrode. Formation of electron-hole pairs occurs due to interaction between the incident radiation and the semiconductor material. If the x-rays have energy greater than the band gap energy of the semiconductor material, then electron-hole pairs are generated in the semiconductor as each photon is absorbed in the material. If a voltage is being continuously applied across the semiconductor material, the electrons and holes will tend to separate, thereby creating a current flowing through the photodetector. The magnitude of the current produced in the photodetector is related to the magnitude of the incident radiation received. After removal of the incident radiation, the charge carriers (electrons and holes) remain for a finite period of time until they either reach the collection electrodes or can be recombined. The term "charge carriers" is often used to refer to either the electrons, or holes, or both.

Some semiconductor materials used for x-ray detectors are selenium, mercuric iodide and lead iodide. The two iodide compounds have a higher mobility product, require a much lower charge collection voltage than selenium, and have additional advantages such as greater temperature stability. However, each of mercuric iodide and lead iodide has physical parameters that affect their performance and ease of use in single layer x-ray detectors.

In mercuric iodide, the carrier mobility is measured to be higher than lead iodide and the lag time is found to be lower. The lower carrier mobility means that it is difficult to use a thick layer of lead iodide, which is more efficient in absorbing a greater fraction of incident x-ray photons, especially at higher photon energies that increase detector sensitivity. However, mercuric iodide is more chemically reactive toward typical contact materials (e.g., aluminum) than is lead iodide and considerable problems have been experienced with contact corrosion in flat panel detectors coated with mercuric iodide.

As mentioned above, photoconductors may also have diode structures based on either a p-i-n or p-n configuration. FIG. 1B illustrates a conventional p-i-n diode. Such a photodiode 100 is termed a "p-i-n" diode for the configuration of semiconductor material in the diode. Photodiode 100 is composed of a p-doped semiconductor (p-type) material layer 110 and an n-doped semiconductor (n-type) material layer 130. Light is made incident on the depletion region between the p-type and the n-type material layers, creating electron-hole pairs and thus a current. To control the thickness of the depletion region, a layer 120 of intrinsic (i) material is inserted between the p-doped semiconductor material layer 110 and the n-doped semiconductor material layer 130. This structure may be used to detect an x-ray which is incident on either the p-doped semiconductor 110 or the n-doped semiconductor 130. Photodetectors based on a p-i-n structure also include contacts to apply bias to the material layers, as illustrated in FIG. 1C. Photodetector 150 includes a top contact conductor 181 connected to p-doped region 182 and a bottom contact conductor 185 connected to n-doped region 184. P-doped region 182, intrinsic layer 183 and n-doped region 184 are all semiconductor materials as described with respect to detector 100. The layers are formed on a substrate 186 that acts as a base for the detector 150.

As mentioned above, the p-i-n structure may be used to detect x-rays that are incident on either of the p-doped semiconductor material layer 182 or the n-doped semiconductor material layer 185. In operation of p-i-n photodiode 150, a reverse-bias voltage is applied across the photodiode and x-rays are made incident upon the intrinsic region 183. The electron-hole pairs then separate under the applied electric field and quickly migrate toward their respective poles. The electrons move toward the positive pole and the holes move toward the negative pole. Conventional photodiodes have narrow intrinsic regions 183. Due to the narrowness of the intrinsic region 183 and also due to the high mobility of the intrinsic material, there is little chance that the carriers will recombine before they arrive at the interface with the doped material. The electrons and holes then collect near the respective interface with the doped material. The change in resistivity results in a change in one or both of a voltage or current between top conductor 181 and second conductor 186, which may be measured in a surrounding system (not shown).

One problem with prior diode structure photoconductors is that dark (leakage) current limits the usefulness of the high x-ray sensitivity of photoconductor sensors. One solution to substantially reducing such dark current is by using p-n heterostructures of photoconductors. Diodes structures (p-n and p-i-n) may be composed of two or more dissimilar semiconductor materials, thereby forming a heterojunction. For example, one prior photodetector consists of a layer of cadmium telluride and a layer of cadmium sulfide forming a heterojunction. The cadmium telluride is deposited so that it is a p-type material (excess holes) and the cadmium sulfide is deposited so that it is an n-type material (excess electrons). An external voltage applied across the heterojunction of the two materials produces a reverse biased p-n junction that acts as a photodiode. As discussed above, radiation induced electron-hole pairs give rise to electrical currents that flow in proportion to the incident radiation. The p-n junction, when reversed biased, inhibits dark current from flowing across the junction.

The performance of a photoconductor may be judged by various criteria including sensitivity. Sensitivity refers to the current produced by a photoconductor with respect to the electromagnetic radiation intensity. A photoconductor with high sensitivity will produce more current for a given intensity of incident radiation than one with a low sensitivity. Sensitivity is affected by many factors including the mobility of the electrons in the material. Semiconductor materials with a higher mobility have a higher sensitivity, if other parameters are similar, because the electrons can move at a greater speed.

Detectors may be capable of sensing mega-voltage (MV) energy x-ray photons if enough of the x-ray radiation can be absorbed and converted into electron-hole pairs (free charge) by a photoconductive conversion layer or absorbed and converted into photoelectrons, in the underlying substrate layer, that then pass up into and are detected by the photoconductive conversion layer. Typically, a high density substrate is used to provide such absorption and photoelectron generation. One problem with many high density substrates is that they are limited in the number of pixel elements they can incorporate or are limited in the physical dimensions of their total detector area (in contrast to a pixilated array of pixels of electronics, such as thin film amorphous silicon transistors, capacitors, switches, and amplifiers on low density glass substrates which can accommodate many millions of individual pixels and hundreds to thousands of square inches of detector area). Moreover, fabrication costs of the high density substrate detectors is more expensive than for fabrication of low density substrates.

SUMMARY

According to some embodiments, a photodetector for detecting megavoltage (MV) radiation includes a semiconductor conversion layer having a first surface and a second surface disposed opposite the first surface, a first electrode coupled to the first surface, a second electrode coupled to the second surface, a low density substrate including a detector array coupled to the second electrode opposite the semiconductor conversion layer and low density substrate. The conversion layer includes a sufficient thickness of a photoconductive material to convert photoelectrons received from the first electrode caused by MV x-ray photons incident upon the first electrode, to a sufficient number of recharge carriers for detection by a detector array, and the low density substrate has a density and thickness so that mega-voltage x-ray photons incident upon the low density layer create substantially none or no more than an insubstantial number or amount photoelectrons to be converted by the conversion layer.

BRIEF DESCRIPTION OF THE DRAWINGS

The present invention is illustrated by way of example and not limitation in the accompanying figures in which.

DETAILED DESCRIPTION

In the following description, numerous specific details are set forth such as examples of specific components, processes, etc. in order to provide a thorough understanding of the present invention. It will be apparent, however, to one skilled in the art that these specific details need not be employed to practice the present invention. In other instances, well known components or methods have not been described in detail in order to avoid unnecessarily obscuring the present invention.

The terms "top," "bottom," "front," "back," "above," "below," and "between" as used herein refer to a relative position of one layer or component with respect to another. As such, one layer deposited or disposed above or below another layer, or between layers, may be directly in contact with the other layer(s) or may have one or more intervening layers. The term "coupled" as used herein means connected directly to or connected indirectly through one or more intervening layers or operatively coupled through non-physical connection (e.g., optically).

A photodetector able to detect megavoltage (MV) radiation is described that may include a low density substrate, at least one high density layer, and a photoconductor conversion layer (e.g., one or more layers of one or more semiconductor materials) to convert photoelectrons to free charge carriers for detection by a detector array of the substrate. Instead of using a high density substrate, another high density layer is used to convert incident megavoltage x-ray photons to a sufficient number of photoelectrons for conversion to a number of free charge carriers for detection.

An advantage of such a structure is that it is capable of sensing mega-voltage (MV) energy x-ray photons because enough of the x-ray photons can be absorbed or converted into high energy photo-electrons for subsequent detection by a photoconductive conversion layer, without using a high density substrate. Thus, although most of the x-ray radiation travels completely through the substrate/photoconductor structure without being absorbed or converted, a portion of the radiation (and thus a portion of the its energy) is absorbed in the high density material and is converted into high energy photo-electrons. The low density substrate can provide a greater number and smaller sized detection electronic devices (e.g., a pixilated array of pixels of electronics such as thin film transistors, capacitors, switches, amplifiers, etc.) than is possible for a high density substrate. Moreover, the low density substrate and detection electronics therein cost less to fabricate than the high density substrate and detection electronics.

Figure 1A:
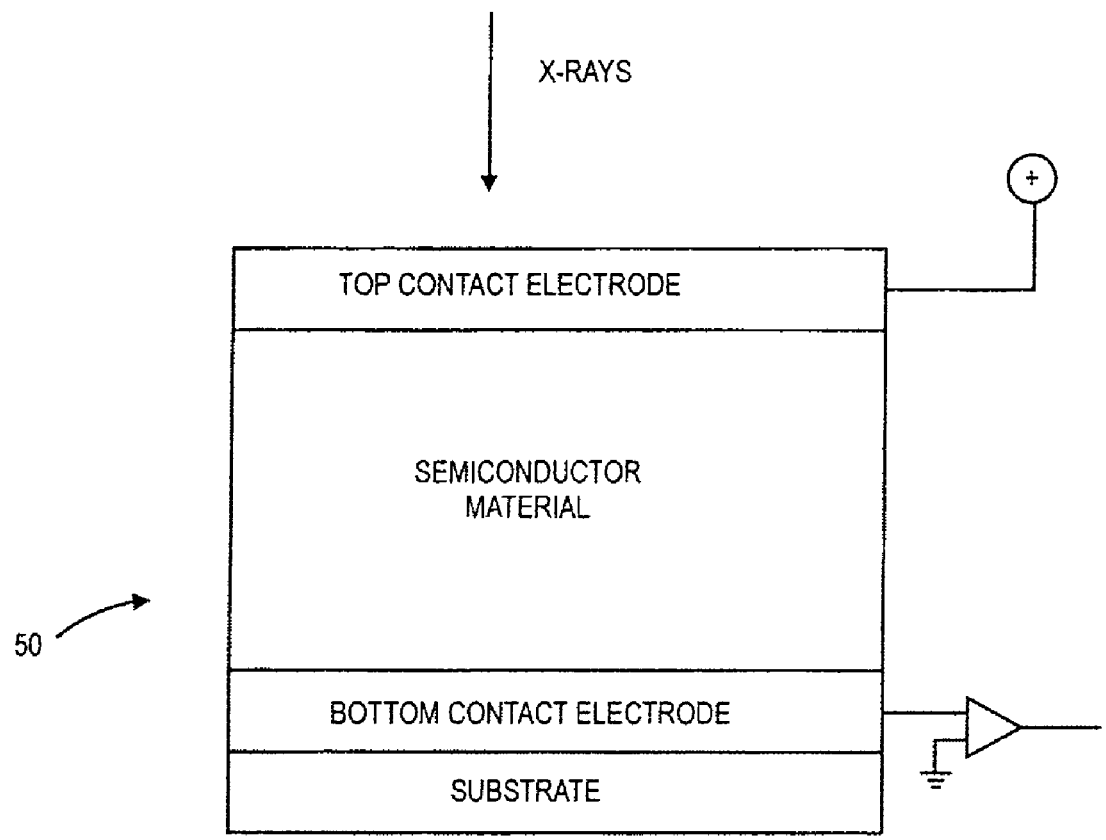
FIG. 1A illustrates one type of conventional photoconductor.
Figure 1B:
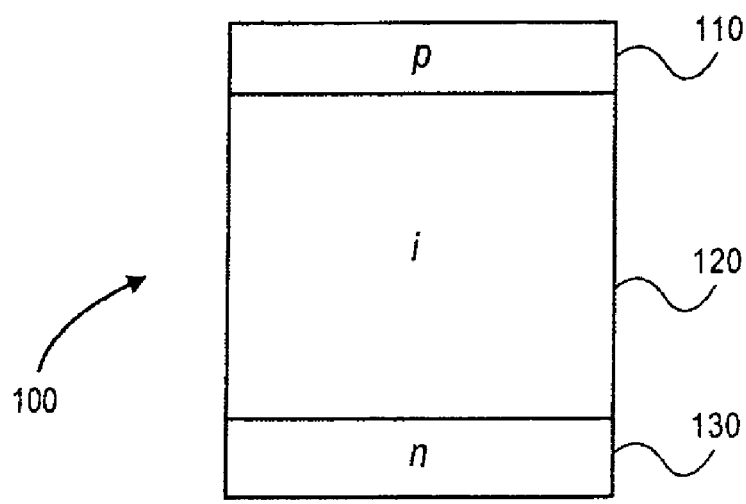
FIG. 1B further illustrates the conventional photoconductor of FIG. 1A.
Figure 1C:
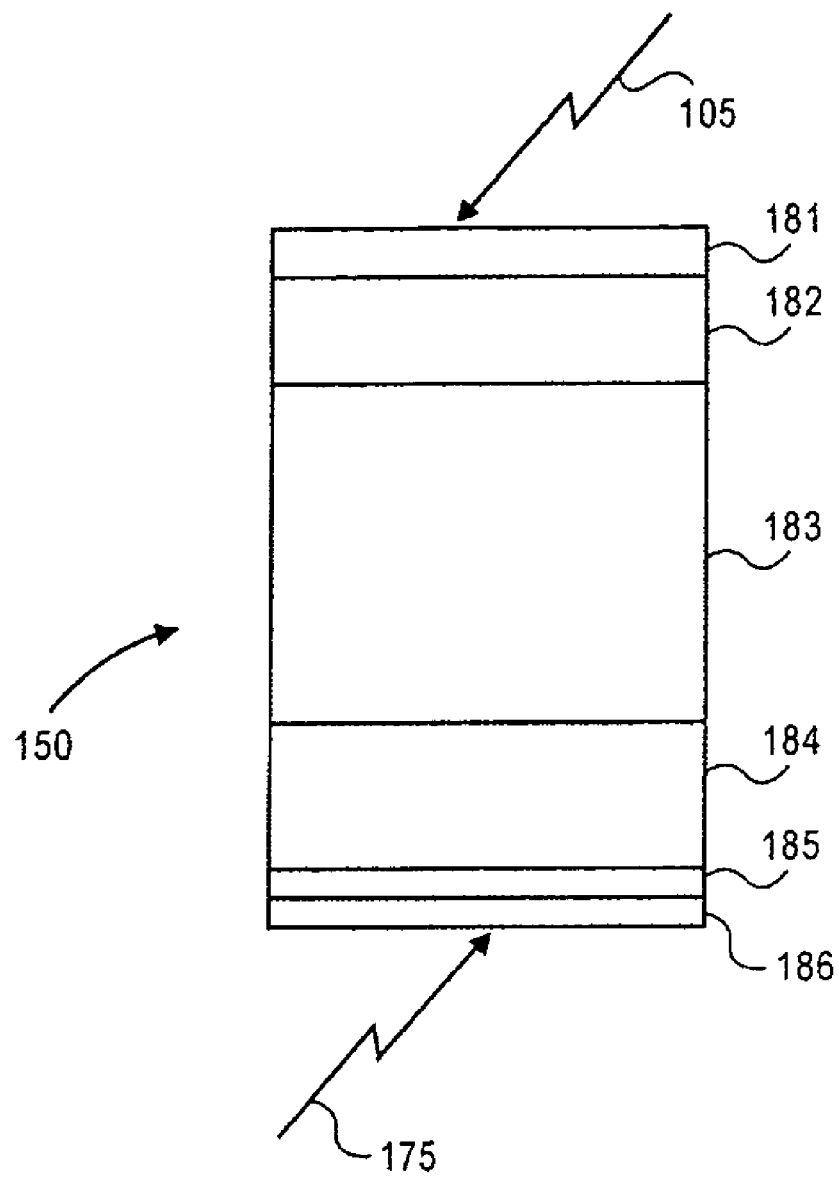
FIG. 1C illustrates another conventional photoconductor
Figure 2A:
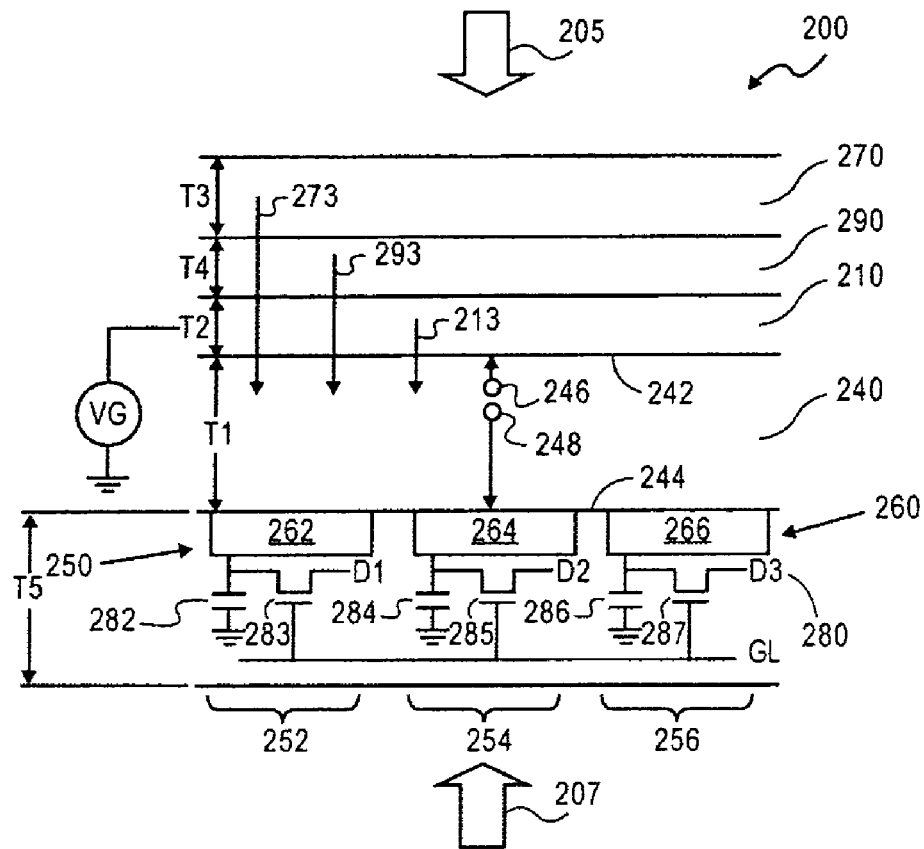
FIG. 2A illustrates one embodiment of a photoconductor based megavoltage radiation sensor.

FIG. 2A illustrates one embodiment of a photoconductor based megavoltage radiation sensor. In this embodiment, photodetector 200 includes semiconductor conversion layer 240 having surface 242 coupled to electrode 210, and having surface 244 coupled to low density substrate 280. Surfaces 242 and 244 are disposed opposite each other, such as to form opposing planar surfaces of a photoconductive film. FIG. 2A shows protective layer 290 coupled between high density layer 270 and electrode 210. Moreover, radiation, such as x-rays may be incident upon photodetector 200 from direction 205 and/or direction 207. In the embodiment of FIG. 2A, substrate 280 includes detector array 260 having electrodes 262, 264, and 266 coupled to surface 244. It can be appreciated that more than three electrodes may be used in place of electrode 262, 264, and 266, in certain embodiments. Alternatively, a single electrode, such as shown for electrode 210, may be used in place of electrode 262, 264, and 266, in certain embodiments.

FIG. 2A also shows substrate 280 including thin film transistor (TFT) capacitors 282, 284, and 286 coupled respectively to thin film transistor (TFT) switches 283, 285, and 287. Gate line (GL) may be used to switch or activate switches 283, 285 and/or 287. Coupled to the output of switches 283, 285, and 287, respectively, are data lines D1, D2, and D3. Substrate 280, electrode 262-266, capacitors 282-286, and/or switches 283-287 may be described herein as part of a detector; a sensor; a detector array; and/or a sensor array; pixels; and/or a pixelated array of TFT devices, capacitors, and/or switches. For instance, a pixelated array of TFT devices may include an array or matrix of more than three electrodes and accompanying TFT structures for each electrode.

FIG. 2A shows electrode 210 coupled to voltage generator VG, which is in turn coupled to ground. Electrode 262 of array 260 is connected to a charge storage capacitor 282, which in turn connected to ground. It is contemplated that various other electrodes of array 260 (e.g., such as electrode 264 and electrode 266) or all of the electrodes of array 260 are connected through storage capacitors (e.g., capacitors 284 and 286) to ground in order that the imaging containing charge of each pixel's storage capacitor is drained off to readout electronics by applying a voltage to the gate readout line GL, so that the switches (e.g., TFTs) 283, 285 and 287 all turn on.

Figure 2B:
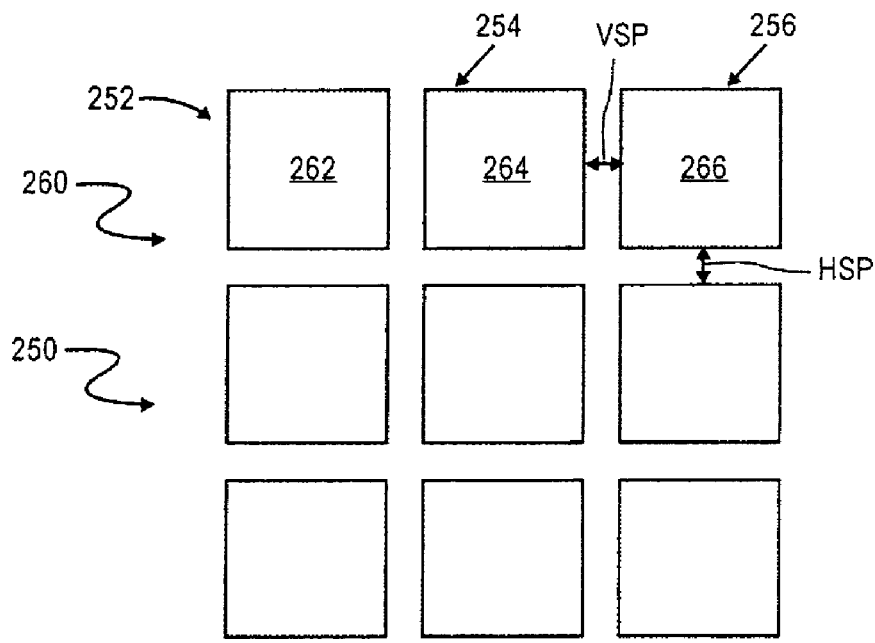
FIG. 2B illustrates the photoconductor based megavoltage radiation sensor of FIG. 2A from a top perspective.

FIG. 2B illustrates the photoconductor based megavoltage radiation sensor of FIG. 2A from a top perspective. FIGS. 2A and 2B show detector array 260 including pixels 252, 254 and 256, such as a pixelated array of electronic devices such as TFT, capacitors, switches, electrodes, gate lines, data lines, amplifiers, etc., as known in the art. Specifically, pixels 252, 254 and 256 may each include the structures shown and described for those pixels with respect to FIG. 2A. For example, pixel 252, representative of any pixel of array 260, may include electrode 262 coupled to capacitor 282, which is in turn coupled to switch 283. The gate of switch 283 is coupled to gate line GL and the output of switch 283 is coupled to data line D1. Various other configurations of electronic devices for each pixel are contemplated, such as embodiments, excluding, or using other devices in place of capacitor 282, and/or switch 283.

Referring to FIG. 2B, according to one embodiment, the top view cross sectional size of each pixel (e.g., pixel 252) may be between 30×30 micrometers and 2×2 mm. Moreover, it is contemplated that the pixels may have various sizes and shapes. For example, within the top view size dimension described above, each pixel may have a rectangular shape, a hexigonal shape, and octagonal shape, a triangular shape, a circular shape, a curved shape, and/or a combination thereof.

Additionally, there may be space or gaps between the pixels so as to provide space between the pixels in substrate 280 for driver lines, read out lines, or other electronics that may or may not be connected to the pixels, and/or TFT devices connected to the pixels. For example, FIG. 2B shows vertical spacing VSP and horizontal spacing HSP between pixels, where each spacing may be a space and arranged between one and ten microns. It is also contemplated that the spacing of the VSP may be equal to, greater than, or less than the spacing of HSP.

According to one embodiment, mega-voltage (MV) x-ray photons incident upon photodetector 200 (e.g., from direction 205 and/or 207) may cause or create photoelectrons when the x-rays interact, collide, or are absorbed by electrode 210, protective layer 290, and/or high density layer 270. The photoelectrons may be high energy photoelectrons.

Moreover, according to one embodiment, electrode 210, protective layer 290, and/or high density layer 270 may include a high density material having a sufficient thickness and a sufficient density to create a sufficient number of photoelectrons from MV x-ray photons incident upon those layers to be converted by conversion layer 240 into a sufficient number of free charge carriers for detection by detection array 260. Furthermore, conversion layer 240 includes a sufficient thickness of a photoconductive material (such as a semiconductor material, photoconductive film, and/or photoconductive layer) to convert the photoelectrons received from electrode 210, protective layer 290, and/or high density layer 270 to a sufficient number of free charge carriers for detection by detector array 260. In other words, one, any combination of, or all of electrode 210, layer 290, and layer 270 may be sufficiently dense, in one embodiment, to convert between one and two percent of incident MV radiation to high energy photoelectrons for conversion by layer 240 to free charge carriers to be detected by pixels 250. It is contemplated that other percentages of the incident MV radiation may be converted by one, any combination, or all of electrode 210, layer 290, and layer 270, such as a percentage between 0.25 percent and 20 percent, depending on the design of the photodetector. It can be appreciated, that a portion or majority of the MV radiation energy may penetrate and pass through photodetector 200 without being absorbed, due to the low density of the components or layers of the photodetector, other than the layer or layers converting MV radiation to photoelectrons.

As the percentage of incident megavoltage radiation converted or absorbed increases (e.g., such as when electrode 210 or layer 290, and/or layer 270 are of increased thickness and/or density), the thickness of layer 240 may decrease, and vice versa. Specifically, when the density increases, more photoelectrons will be produced for a specific energy or power of incident radiation, thus requiring a reduced thickness of layer 240 to convert a sufficient amount of the photoelectrons to free carriers. Correspondingly, when the density or thickness of the high density material decreases, fewer photoelectrons are produced from a given power or energy of radiation, and thus layer 240 is thicker to sufficiently convert the fewer photoelectrons to sufficiently recharge carriers for detection.

More specifically, FIG. 2A shows high density layer 270 having a thickness T3, such as a thickness between 0.1 and 10 mm in thickness. In some cases, T3 may be 0.1, 0.2, 0.4, 0.8, 1, 2, 4, any number therebetween, or a combination thereof of mm in thickness. Also, layer 270 may includes one or more of copper, lead, tungsten, tantalum, iridium, leaded glass, leaded plastic, other leaded material, and/or alloys thereof. In some cases, layer 270 may include a thickness of between 0.2 and 1.5 mm of lead, copper, a lead alloy, a copper alloy, or a combination thereof. It is also contemplated that layer 270 may include one or more layers of a material described above, an alloy thereof, or a combination thereof. For example, layer 270 may be a 1 mm thick film or foil of copper, tungsten, or lead or other metal or dense material. In addition, as noted above, the thickness of layer 240 may depend on the thickness and existence of layer 270. As such, for an embodiment where layer 270 is a 1 mm thick layer of material, layer 240 may have a thickness of 0.5 microns; while alternatively, when layer 270 does not exist, layer 240 may have a thickness of 10 mm. It can be appreciated that these numbers do not have to be exact, and may range within 25 percent in actual practice.

Thus, layer 270 may be of a sufficient thickness of a dense material to absorb a sufficient amount of incident radiation having a power of at least one megavolt (such as by absorbing x-ray photons) to convert the incident radiation to photoelectrons for conversion by layer 240 and detection by array 260. Specifically, layer 270 may be a layer having a sufficient combination of thickness and density to produce high energy photoelectrons having enough energy to escape from a depth of between 2 and 50 microns and depth under the surface of layer 270 coupled to protective layer 290. Moreover, the high energy photoelectrons produced can have enough energy to escape to conversion layer 240 to produce free charge carriers for detection by array 260.

Furthermore, according to one embodiment, layer 270 may be a sufficient thickness (e.g. 1 mm) of a sufficiently dense material (e.g. lead) to reduce the scattering. Most imaging information is contained in the unscattered photons passing through an object straight down to the detector's pixels. The radiation scattered in the object travels at an angle (compared to unscattered) and produces a longer path through the layer 270. Thus, less of the image blurring, scattered radiation survives down to the detector's pixels when the 270 layer is sufficiently thick and dense because it is unable to survive the longer path, and is "filtered out." For example, layer 270 may have a sufficient thickness of a high density material to reduce detection of scattered megavoltage x-ray photons from a subject object (e.g., an object upon which the x-ray photons are incident prior to encountering the detector) due to a longer path length that scattered radiation is required to travel in the high density layer, as compared to a shorter path traveled by unscattered radiation in the high density layer. Also, layer 270 may have a density of between approximately 4 and 23 or more gm/cm$^3$ in density. It is considered that the density of layer 270 may be a density of 1, 2, 4, 8, 10, 20, any number therebetween, or a combination thereof of gm/cm$^3$ in density. For instance, layer 270 may have a density in a preferred range of between approximately 5 and 20 gm/cm$^3$ in density; or a more preferred range of between approximately 9 (e.g., approximately the density of Copper) and 19 (e.g., approximately the density of Tungsten) gm/cm$^3$ in density. In some cases layer 270 may have a density of approximately 11 gm/cm$^3$ in density (e.g., approximately the density of lead), a density of approximately 22 gm/cm$^3$ in density (e.g., approximately the density of iridium), or a density of up to approximately 39 gm/cm$^3$ in density.

Protective layer 290 may function as a sufficient high density layer to convert megavoltage radiation to a sufficient number of photoelectrons for conversion by layer 240 and detection by array 260, such as described above with respect to layer 270. Likewise, layer 290 may reduce scattering of incident radiation, such as described above with respect to layer 270. In addition, according to one embodiment, layer 290 may be a protective layer of a material that is non-reactive with the material of layer 270. Moreover, layer 290 may be an insulator material, such as paralyene C, or Mylar™ (e.g., including polyethylene terephthalate), or HumiSeal™ (e.g., an acrylic or vinyl polymer that is formed from a material including the polymer, toluene and methyl ethyl ketone), and/or acrylic material. In some cases, layer 290 may protect conversion layer 240, electrode 210, array 260 and electrodes thereof (e.g., electrode 262), and/or substrate 280 from damage due to exposure to air, humidity, and/or corrosion. Layer 290 may have thickness T4 sufficient to protect electrode 210 from damage and/or inhibit corrosion, such as caused by a chemical reaction between the material of electrode 210 and the material of layer 270, and vice versa. Layer 290 may have thickness T4 of between 0.1 and 50 microns. In some cases, T4 may be 0.1, 0.2, 0.4, 0.8, 1, 2, 4, 8, 10, 20, 40, a number therebetween, or a combination thereof of microns in thickness.

In some cases, layer 290 has a thickness of less than 10 microns to allow photoelectrons generated by layer 270 (e.g., resulting from MV x-ray incidents upon layer 270) to be transmitted through layer 290 to layer 240 for detection by array 260. Alternatively, layer 290 may have a thickness greater than 10 microns so that photoelectrons are generated by electrode 210 (e.g., from MV x-rays incident upon electrode 210) sufficiently to be transmitted to layer 240 and detected by array 260. In this case, layer 290 is too thick for the photoelectrons generated at layer 270 to be transmitted through layer 290 and to layer 240.

Electrode 210 may be a sufficient thickness (e.g., T2) of a sufficiently dense material to create or generate a sufficient number of photoelectrons for conversion by layer 240 and detection by array 260, such as described above with respect to layer 270 (e.g., such as in response MV radiation incident upon electrode 210 causing high energy photoelectrons to be transmitted to layer 240). In addition, electrode 210 may reduce scattering, such as described above with respect to layer 270. Moreover, according to one embodiment, electrode 210 may include palladium, platinum, carbon, gold, copper, aluminum, indium tin oxide (ITO), and alloys thereof, a mixture thereof. It is also considered that electrode 210 may include a number of layers of any of those materials, alloys, or combinations.

Electrode 210 may have thickness T2 of between 0.1 and 1000 microns in thickness. Thickness T2 may be a thickness of 0.5, 1, 2, 4, 8, 10, 20, 40, 80, 100, 200, 400, any number therebetween, or a combination thereof of microns in thickness. Further, electrode 210 may be a continuous upper conducting electrode covering surface 242 or a major portion of surface 242 of layer 240.

Conversion layer 240 may be a photo conversion layer, which are known in the art. In some cases, layer 240 may be a wide band gap photoconductive material having a sufficient thickness (e.g., T1, as described below) to generate or produce free charged carriers from photoelectrons (e.g., high energy photoelectrons) received from electrode 210, layer 290, and/or layer 270, where the free charge carriers have a sufficient number to be detected by array 260. More particularly, FIG. 2A shows arrow 273 representing photoelectrons received by layer 240 from layer 270 as a result of MV radiation incident upon layer 270 from direction 205 and/or direction 207. Similarly, arrow 293 represents photoelectrons received by layer 240 from layer 290 resulting from MV radiation incident upon layer 290 from direction 205 and/or direction 207. Likewise, arrow 213 represents photoelectrons received by layer 240 from electrode 210 resulting from MV radiation received by electrode 210 from direction 205 and/or direction 207. The photoelectrons received by layer 240 are converted to free charge carriers, such as shown by free charge carrier 246, and opposing free charge carrier 248. It can be appreciated that free charge carrier 246 may be a hole, or an electron, while carrier 248 may be the opposite type of carrier.

In alternative embodiments, semiconductor materials other than mercuric iodide and lead iodide may be used, such as other semiconductor halides, for example. In one embodiment, such alternative materials may be iodide compounds such as bismuth iodide ($BiI_2$). Alternatively, non-iodide compounds and may be used, for example, thallium bromide (TlBr). The semiconductor materials selected for use may operate as a corrosion barrier layer to a contact and/or as part of a heterojunction structure to optimize the electric parameters of the detector (e.g., reduce dark currents). The other semiconductor materials that may be used for layer 240 may have band gaps approximately the same or different than either of mercuric iodide (2.1 eV) and lead iodide (2.3 eV). For example, bismuth iodide has a band gap of 1.73 eV and thallium bromide has a band gap of 2.7 eV. As previously noted, yet other halides may also be used for the semiconductor material layers.

Moreover, according to one embodiment, layer 240 may be a layer having thickness T1 of between 20 and 20000 microns in thickness of mercuric iodide ($HgI_2$), lead iodide ($PbI_2$), bismuth iodide ($BiI_2$) bismuth triodide ($BiI_3$), amorphous selenium, and/or thallium bromide (TlBr), an alloy thereof, and/or a combination thereof. It is contemplated that layer 240 may be multiple layers of materials, alloys, and/or combinations of the materials mentioned above, such as two or three different material in a layered structure. In some cases, thickness T1 may be a thickness of 10, 20, 40, 80, 100, 200, 400, 800, 1000, 2000, 4000, 8000, 10,000, any number therebetween, or a combination thereof of microns in thickness.

For instance, layer 240 may be a layer of lead iodide ($PbI_2$) or a layer of mercuric iodide ($HgI_2$). Alternatively, a layer of each of lead iodide ($PbI_2$) and mercuric iodide ($HgI_2$) may be used to form a bi-layer $PbI_2$—$HgI_2$ coating film for use as layer 240. As an example combination of $PbI_2$, $BiI_3$ (Bismuth Triodide) and $HgI_2$ can also be used as a three layer $PbI_2$—$BiI_3$—$HgI_2$ "sandwich" structure. Moreover any combination of mercuric iodide ($HgI_2$), lead iodide ($PbI_2$), bismuth iodide ($BiI_2$) bismuth triodide ($BiI_3$), amorphous selenium, and/or thallium bromide (TlBr), and alloy of some of them could also be used.

For example, the thickness of layer 240 may be selected specifically for absorption of photoelectrons resulting in megavoltage radiation absorbed by the selected material and thickness of electrode 210, layer 290, and layer 270 (as well as the decision choice as to whether optional layer 290 and/or optional layer 270 will be used in the photodetector). For instance, layer 240 may have thickness T1 between 20 and 1000 microns in thickness of a photoconductive material. In addition to the factors above, thickness T1 may be selected depending on the output voltage of array 260, such as depending on the desired output voltage at dataline D1 when MV radiation is incident upon the photo detector. In some cases, layer 240 may have a thickness sufficient to cause the output voltage at the dataline to be between 0.2 volts and 2 volts, such as a voltage similar to the output of datalines for kilovoltage (KV) radiation photodetectors, or other photodetectors. Specifically, layer 240 may have thickness T1 greater than 1000 microns and/or a thickness to ensure that the output signals of pixels of array 260 is sufficient in response to incident megavoltage radiation to provide an image (as will be described further below with respect to FIGS. 6 and 7).

Substrate 280 may be a low density substrate, such as a pixilated array of pixels of electronics, including thin film amorphous silicon transistors, capacitors, switches, and/or amplifiers on a low density glass or semiconductor substrate. Substrate 280 may be able to accommodate many millions of individual pixels and hundreds to thousands of square inches of detector area. According to some embodiments, substrate 280 has a density and thickness so that mega-voltage x-ray photons incident upon the low density layer create few or substantially no photoelectrons or no more than an insubstantial number or amount of photoelectrons. The photoelectrons produced as described above may be those that are converted to free charge carriers by conversion layer 240. Substrate 280 may have thickness T5 of between 10 and 10,000 microns in thickness. Thickness T5 may be a thickness of 10, 20, 40, 80, 100, 200, 400, 800, 1000, 2000, 4000, 8000, any number therebetween, or a combination thereof of microns in thickness. Moreover, substrate 280 may have a density of between 0.1 and 8 gm/cm³ in density, such as a density of 0.1, 0.2, 0.4, 0.8, 1, 2, 4, 8, any number therebetween, or a combination thereof of grams per centimeter cubed in density. For instance, substrate 280 may have a density in a range of between approximately 0.7 and approximately 7.7 gm/cm³ in density; a preferred range of between approximately 2 and approximately 3 gm/cm³ in density; or a more preferred range of between approximately 2.3 (e.g., the density of a lower density glass) and 2.5 (e.g., the density of a higher density glass) gm/cm³ in density. Although the density ranges described herein for high density layer 270 and low density substrate 280 overlap, it is considered that for an embodiment having a high density layer, a specific minimum density for the high density layer 270 will not be less dense than a maximum density for low density substrate 280. For embodiments that do not include a high density layer, low density substrate 280 may have any density as described herein. Also, in embodiments, substrate 280 may have a density less than the density of a conductive metal, a conductive alloy, aluminum, copper, iridium, brass, steel, stainless steel, iron, leaded glass, indium-tin-oxide (ITO) on glass (silicate), lead, tungsten, or alloys thereof. In those embodiments, a substrate of or including the material listed above may be considered a high density substrate (e.g., that material may be a high density substrate material). Also, according to some embodiments, substantially all of the high energy photoelectrons are produced by the collision of the megavoltage X-ray photons and a high density layer, and few or substantially none, or no more than an insubstantial number or amount high energy photoelectrons are produced by the collision of the megavoltage X-ray photons and low density substrate layer 280. The photoelectrons produced as described above may be those that are converted into free charge carriers in layer 240 and/or detected in layer 260. Substrate 280 may be or include a substrate or one or more layers of a semiconductor material, a plastic material, a silicon material, a silicon alloy material, a glass, or another low density material capable of supporting or including a detector or sensor circuit to detect the free charge carriers as described herein. For example, substrate 280 may include an unleaded plate, layer, film, or substrate of a plastic material, a silicon material, or a glass material. Also, substrate 280 may be ITO coated glass, flexible plastic, or other flexible material. In many cases, substrate 280 may be more easily and/or cheaply fabricated, and/or constructed of more standard materials having TFT devices, or for forming TFT devices therein than a high density substrate. For example, one of skilled in the art may know how to make substrate 280 having a pixelated array of pixels of electronics, as described herein, as the materials and processes have been used for producing such substrates for other purposes such as to provide a pixelated array for detection of photons, electrical charge, or electrical current. In some cases, substrate 280 may be an unleaded glass plate including amorphous silicon TFT electronic switches and capacitors coupled to electrodes 262 through 266 which are pixelated electrodes of indium tin oxide (ITO) to create array 260. It is considered that electrodes 262, 264 and 266 may be a material and/or have a thickness as described above with respect to electrode 210.

Figure 3:
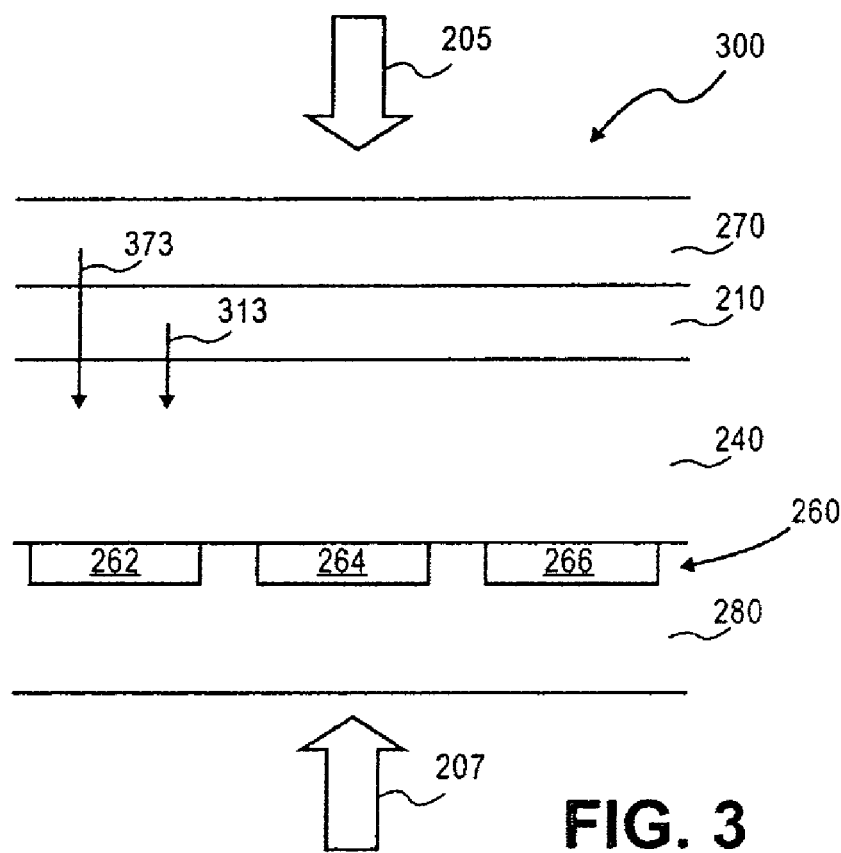
FIG. 3 illustrates an alternative embodiment of a photoconductor based megavoltage radiation sensor.

FIG. 3 illustrates an alternative embodiment of a photoconductor-based megavoltage radiation sensor. FIG. 3 shows photodetector 300 which is similar to photodetector 200 without protective layer 290. Thus, in the embodiment shown in FIG. 3, photoelectron caused or created in layers 270 and/or electrode 210 from MV radiation incident upon those layers from direction 205 and/or direction 207 are shown as arrows 373 and 313, respectively. Either or both of the arrows represent a sufficient number of photoelectrons to be converted by layer 240 and detected by layer 260. In some embodiments of photodetector 300, layer 270 can assist in efficiently applying a bias voltage across the top surface of layer 240, such as where a voltage generator (e.g., see voltage generator VG of FIG. 2A) is also coupled between layer 270 and pixels 262, 264 and 266. The voltage generator coupled to layer 270 may be the same voltage generator as that coupled to electrode 210. Moreover, a voltage generator may be coupled to layer 270 while no voltage generator is coupled to an electrode 210. In such cases, electrode 210 may be thin, such as having a thickness of between 0.5 and 0.15 microns.

Figure 4:
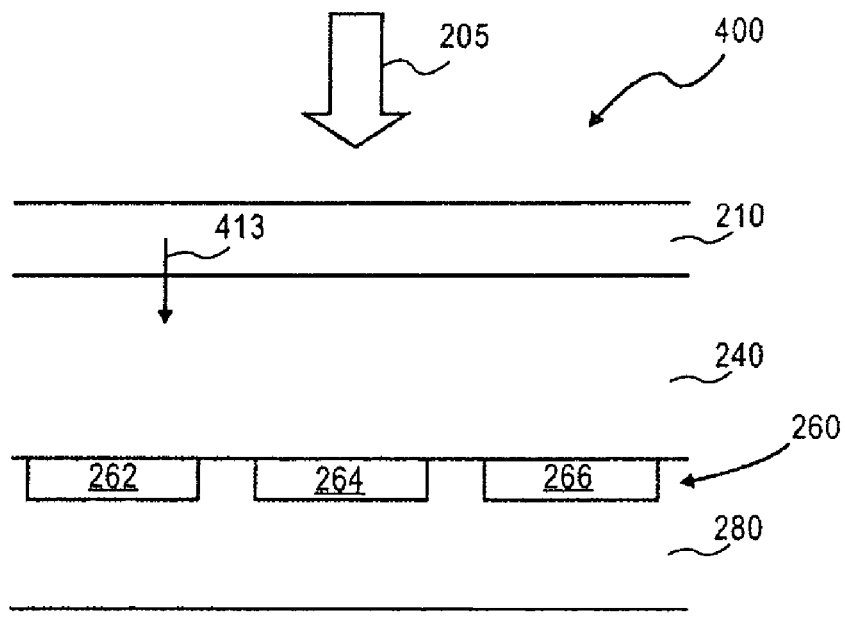
FIG. 4 illustrates another alternate embodiment of a photoconductor based megavoltage radiation sensor.

FIG. 4 illustrates another alternative embodiment of a photoconductor based megavoltage radiation sensor. FIG. 4 shows a photodetector 400, which is similar to photodetector 300, excluding layer 270. Thus, MV radiation incident upon electrode 210 from direction 205 and/or direction 207 causes a sufficient number of photoelectrons, shown by arrow 413, to be converted by conversion layer 240 and detected by array 260. For instance, in the embodiment of photo detector 400, electrode 210 may have a thickness of greater than 50 microns, such as a thickness of 50, 75, 100, 200, 400, 800, any number therebetween, or a combination thereof of microns in thickness.

Figure 5:
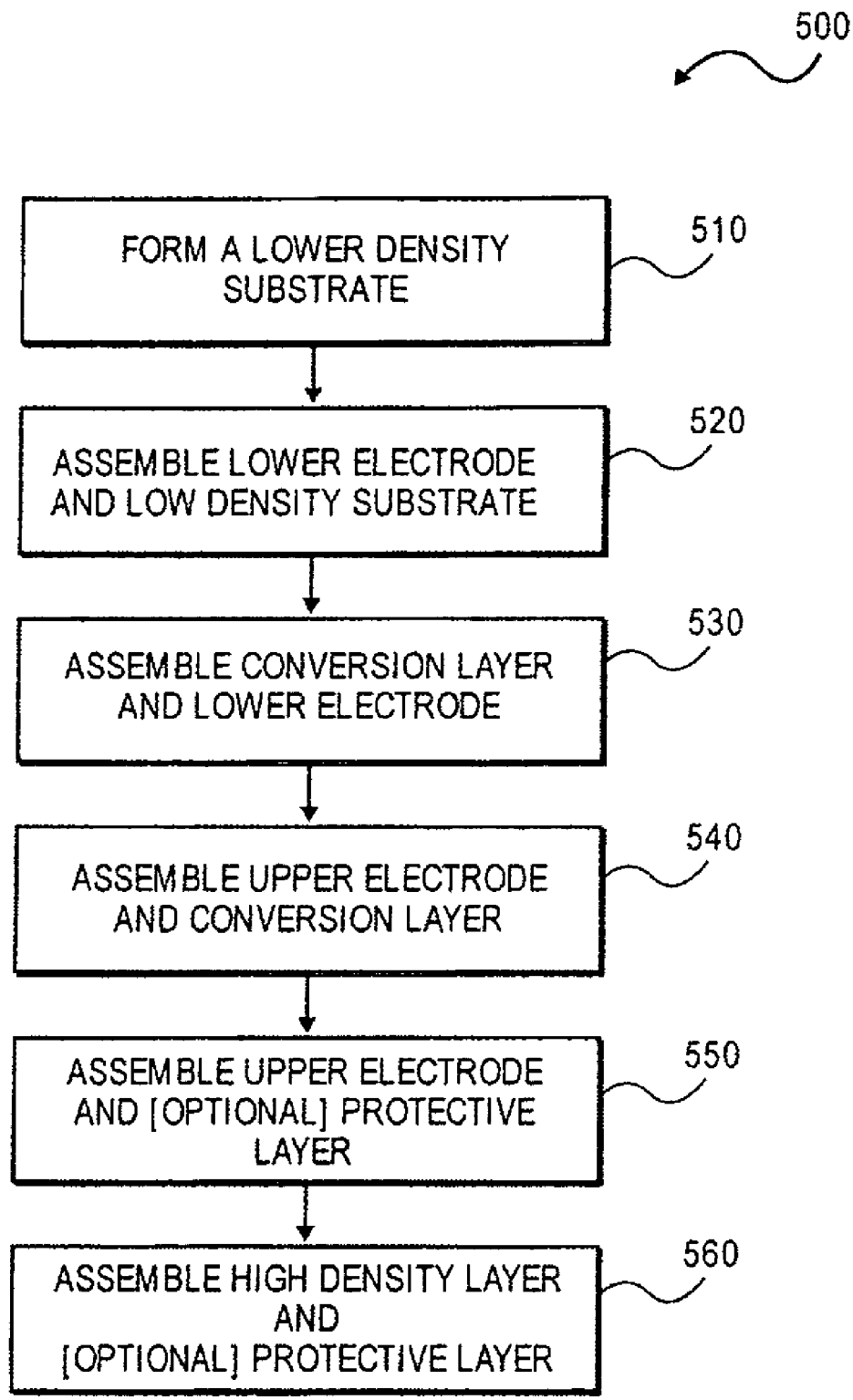
FIG. 5 illustrates one embodiment of a method of fabricating a photoconductor based megavoltage radiation sensor.

FIG. 5 illustrates one embodiment of a method of fabricating a photoconductor based megavoltage radiation sensor. FIG. 5 shows the process 500, for fabricating and/or assembling a sensor as described above with respect to photodetector 200, 300, and 400 of FIGS. 1-4.

At block 510, a low density substrate is formed. Block 510 may include forming or manufacturing a substrate having pixelated arrays of thin film transistors and capacitors, such as using processes and/or substrate processing known in the art. Also, block 510 may include forming substrate 280, detector array 260, capacitors 282 through 286, and/or switches 283 through 287. It can be appreciated that block 510 may include forming the substrate according to various application processes as known in the art.

It is also considered that instead of forming a low density substrate at block 510, such a substrate may be provided for subsequent blocks or process 500. For instance, such a substrate may be pre-formed or pre-manufactured (e.g., such as by another entity or at a different location) and integrated in process 500 at block 520.

At block 520, a lower electrode is formed or assembled to the low density substrate. Block 520 may include forming, attaching, joining, adhering, disposing above, forming in, or covering portions of the substrate 280 with electrodes 262, 264, and 266. For instance, block 528 may include various techniques known in the art, such as coating, plating, physical vapor deposition, chemical vapor deposition, sputtering, ion beam deposition, etc. including non-vacuum processes such as particle-in-binder formation and screen printing.

At block 530, the conversion layer is formed on or assembled to the lower electrode. For example, block 530 may include processes above with respect to block 520, but performing a semiconductor material, such as known in the art. Thus, block 530 may include forming conversion layer 240 by various techniques known in the art such as physical vapor deposition, chemical vapor deposition, sputtering, ion beam deposition, etc. including non-vacuum processes such as particle-in-binder formation, screen printing, casting, extruding, pressing, stamping and spraying.

In an embodiment, as discussed above, the photoconductor may include additional semiconductor materials. In one such embodiment, an additional semiconductor material is deposited above the initial semiconductor material to form layer 240.

At block 540, the upper electrode is formed on or assembled to the conversion layer. Block 540 may include processes described above with respect to block 520. Moreover, block 540 may include forming a continuous upper conducting electrode using various techniques known in the art, such as coating, plating, physical vapor deposition, chemical vapor deposition, sputtering, ion beam deposition, etc. including non-vacuum processes such as particle-in-binder formation, screen printing, casting, extruding, pressing, stamping and spraying.

At block 550, the protective layer is formed on or assembled to the upper electrode. Part of block 550 is optional, and process 500 may terminate at block 550 or 540 with the formation of the upper electrode, such as to form photodetector 300 or 400 as shown in FIG. 3 or 4. Block 550 may include forming an insulating layer as known in the art. Moreover, block 550 may include forming a protective layer using powder, sheets (e.g., such as Saran Wrap™), physical vapor deposition (PVD), brushing (such as Humiseal™), spraying, etc. Block 550 may include assembling a preformed protective layer, such as where the preformed layer is formed as is described above but is subsequently located over or on the upper electrode. It is considered that the protective layer may be a layer that is not adhered to the upper electrode, but is laid on or covers the electrode and is held in place by attachments, screws, rivets, bolts, nuts, or other attachment devices around the edge of the photodetector.

At block 560, a high density layer is formed on or assembled to the protective layer. Block 560 is also optional, such as when forming photodetector 400, as shown in FIG. 4. As described above, the protective layer is optional and may be excluded, such as in a process to form photodetector 300, as described for FIG. 3. Alternatively, it is contemplated that block 550 may be included in process 500 and block 560 may be deleted, such as to form an embodiment similar to photodetector 400, with the addition of layer 290 formed on electrode 210 (e.g., an embodiment not shown in a figure herein).

Block 560 may include forming a high density layer as known in the art. For example, block 560 may include forming a layer 270 using techniques such as forging, casting, electroplating, spraying, physical vapor deposition, chemical vapor deposition, sputtering, ion beam deposition, etc. including non-vacuum processes such as particle-in-binder formation and screen, printing, extruding, pressing, stamping and spraying, as well as brushing, a process using powder, sheeting, etc., as known in the art. Moreover, Block 560 may include forming the high density layer using techniques as known in the art, as described above with respect to forming the lower electrode at block 520. The high density layer of block 560 may not be adhered to the protective layer or the upper electrode, but may be laid over or a cover thereon and is held in place, similar to the description above with respect to the protective layer of block 550. Moreover, in an embodiment including the protective layer and the high density layer, both layers may not be adhered to the upper electrode and for each other but may be laid over or cover the layer below and be held in place as described at block 550. In some cases, the protective layer and high density layer are both laid on or covered over the upper electrode and held in place by a frame, screws, bolts, adhesive, or other attachment devices or means around the perimeter of a photodetector.

Block 560 may include assembling a pre-formed high density layer, such as a film, a foil, a sheet, or other version of layer 270 to be laid over, laid on, or assembled to the protective layer or upper electrode and held in places as described for block 550.

It is also considered that process 500 may include forming a sponge foam, carbon fiber, or other coating, cover, or protectant on the final layer or top layer of the photodetector (e.g., whether that layer be high density layer 270, protective layer 290, or upper electrode 210). For example, such a foam, fiber, or protectant can be formed by physical vapor deposition, chemical vapor deposition, sputtering, ion beam deposition, etc. including non-vacuum processes such as particle-in-binder formation, screen printing, casting, extruding, and pressing, as well as, brushing, spraying, etc. as known in the art.

It should be noted that the process illustrated is simplified, and may involve patterning (such as for isolation of individual conductors for example) or polishing (such as to planarize a layer). Furthermore, a self-aligned process may be used, in which individual detectors are separated out through etching of some form after formation of layers on the substrate.

Figure 6:
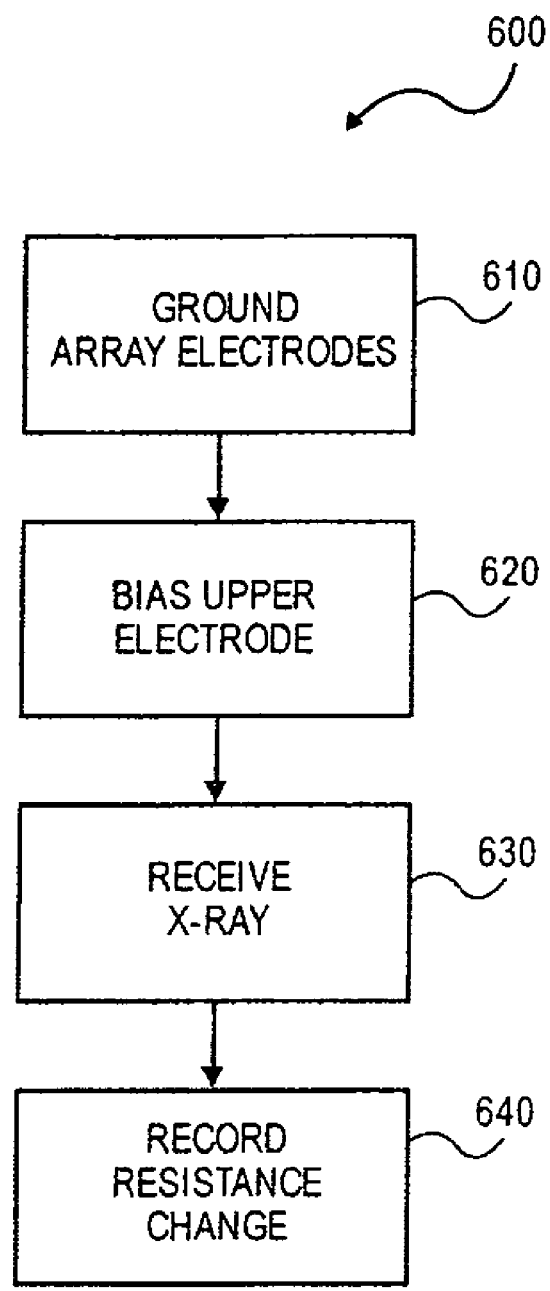
FIG. 6 illustrates one embodiment of a method of operating a photoconductor based megavoltage radiation sensor.

FIG. 6 illustrates one embodiment of a method of operating a photoconductor based megavoltage radiation sensor. FIG. 6 shows process 600 such as a process for detecting or sensing megavoltage radiation using a photodetector, such as detector 200, 300, or 400.

At block 610, the array electrodes are grounded. Block 610 may correspond to grounding electrodes 262 through 266 of the array 260, such as by coupling those electrodes to an electrical ground.

At block 620, the upper electrode is biased. Block 620 may correspond to forming a voltage bias a described above with respect to voltage generator VG of FIG. 2A and bias descriptions for FIG. 3. For example, where conversion layer 240 is mercuric iodide, block 620 may include biasing electrode 210 to a negative voltage with respect to electrodes of array 260, when MV radiation incident from direction 205. The biasing may be reversed when the radiation is incident from direction 207.

Alternatively, where layer 240 is a layer of lead iodide, electrode 210 may be biased positive with respect to electrodes of array 260 when radiation is incident from direction 205, and biased negative for radiation incident from direction 207. Thus, at block 620, the electrodes are biased so that free charge carriers converted by layer 240 from photoelectrons received from electrode 210, layer 290, and/or layer 270 are gathered or detected by array 260. For example, the biasing may cause free charge carriers gathered at electrode 262 to be stored in capacitor 282 under the bias applied. The charge stored in capacitor 282 may subsequently be electronically switched by switch 283 (e.g., such as switching switch 283 by activating gate line GL) and output to dataline D1. The output at various data lines, such as D1-D3 may then be collected by electronic image and electronic image circuit to create an image of an object, person, or other material disposed between a source of MV radiation and photodetector 200, 300, or 400.

For example, at block 630, x-rays are received by the photodetector. Block 630 may include receiving x-rays from direction 205 and/or direction 207 as described with respect to FIG. 2A. Moreover, block 630 may include receiving x-rays incident upon a photodetector as described herein after the x-rays have passed through and/or been diffracted by all or a portion of an object, a person, a plant, luggage, etc. For example, diffracted x-rays may include x-rays diffracted from a beam of x-rays to various diffraction angles by interaction of the beam of x-rays by an object, a person, a plant, luggage, etc.

Block 630 may include receiving MV x-rays having an energy in a range of between 1 and 1000 MV, such as having an energy of 1, 2, 4, 8, 10, 20, 40, 80, 100, 200, 400, 800, any number therebetween, or a combination thereof of MV in energy. In some embodiments, block 630 includes receiving radiation or x-rays produced by an electron beam generator, by directing a beam through a dynamic multileaf collimator (e.g., such as a collimator, including a series of stacked metal shims having a center of shim pairs where each shim of the pairs can be individually moved to create a shaped opening capable of shaping a beam of radiation). The radiation may be for x-raying objects for security purposes, radiating food, medical imaging purposes, and/or medical therapeutic purposes. For example, MV radiation or x-rays may be in a range of between 1 and 25 MV in energy. It is also contemplated that KV radiation may be incident upon and/or detected by a photodetector and described herein, such as KV radiation in a range between 50 and 160 KV in energy (e.g., a range in energy for x-raying objects or for medical imaging purposes).

At block 640, a resistance change is recorded. For example, block 640 may include recording the resistant change between pixels of array 260 and electrode 210 for each pixel resulting from the x-rays received at block 630. Block 640 may include recording the resistance change using a detection system, such as to record a change in resistance as a current or voltage change to register the presence or magnitude of x-rays received at one or more pixels of pixels 250 and/or array 260.

Figure 7:
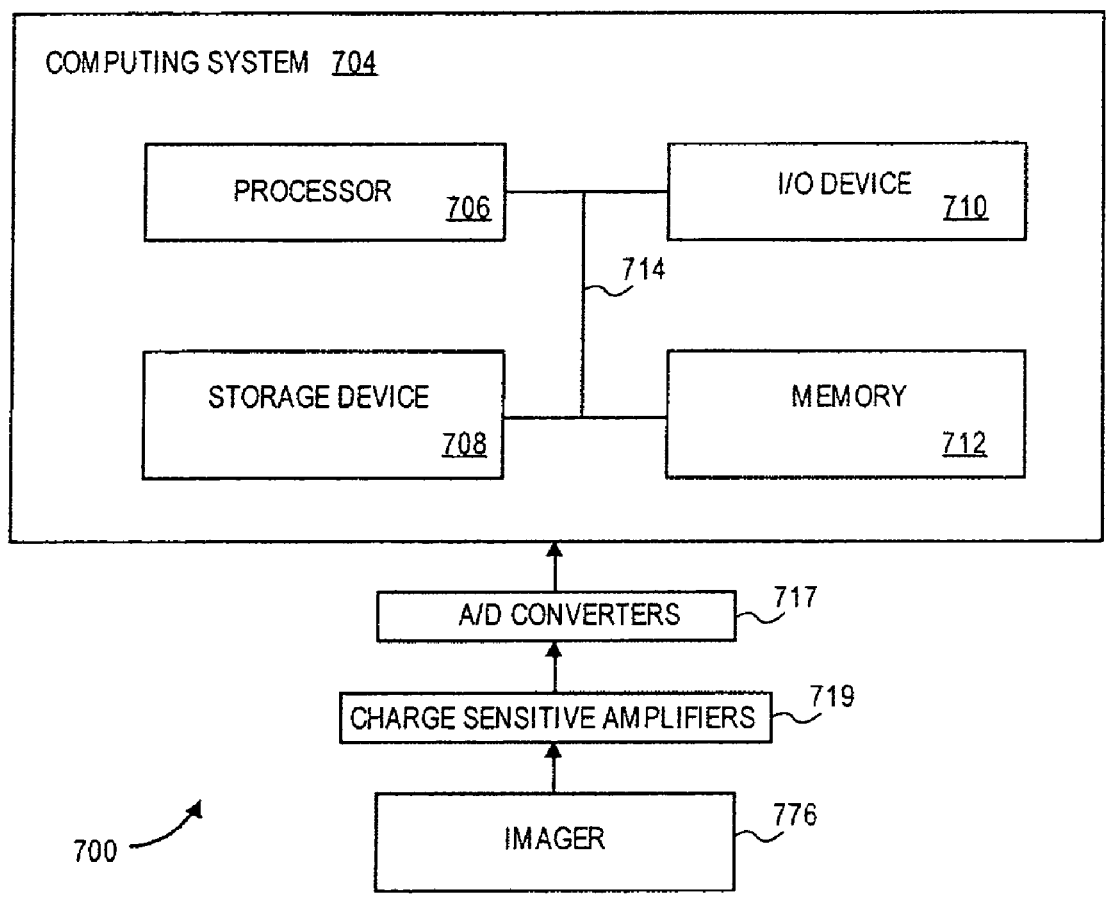
FIG. 7 illustrates one embodiment of a megavoltage x-ray radiation detection system.

FIG. 7 illustrates one embodiment of a megavoltage x-ray radiation detection system. X-ray detection system 700 includes a computing device 704 coupled to a flat panel detector 776. Flat panel detector 776 may operate by accumulating charge on capacitors generated by pixels of photodetector 200, 300 or 400. Typically, many pixels are arranged over a surface of flat panel detector 776 where, for example, TFTs at each pixel connect a charged capacitor (e.g., capacitor 282) to charge sensitive amplifier 719 at the appropriate time (e.g., use dataline D1). In one embodiment, an x-ray detector 776 may be constructed, for example, as a flat panel detector with a matrix of one or more of photodetectors 200, 300 or 400 with readout electronics to transfer the photon (e.g., x-ray) intensity of a pixel to a digital signal for processing. The readout electronics may be disposed around the edges of the detector to facilitate reception of incident x-rays on either surface of the detector.

The flat panel detector may use, for example, TFT switch matrix coupled to the detector 200 and capacitors to collect charges produced by the current from array 260. The charges are collected, amplified and processed, such as by system 700. The choice of bias voltage may determine the sensitivity of the detector and may be applied as described above for block 620 of FIG. 6. The bias voltage may be configured by system 700. Charge sensitive amplifier 719 drives analog to digital (A/D) converter 717 that, in turn, converts the analog signals received from amplifier 719 into digital signals for processing by computer device 704. A/D converter 717 may be coupled to computing device 704 using, for example, I/O device 710 or interconnect 714. A/D converter 717 and charge sensitive amplifiers 719 may reside within computing device 704 or flat panel detector 776 or external to either device.

Amplifiers 719 integrate the charges accumulated in the pixels of the flat panel detector 776 and provide signals proportional to the received x-ray dose. Amplifiers 719 transmit these signals to A/D converter 717. A/D converter 717 translates the charge signals to digital values that are provided to computing device 704 for further processing. Although the operation of switch matrix may be discussed herein in relation to a TFT matrix, such is only for ease of discussion. Alternatively, other types of switch devices, such as switching diodes (e.g., single and/or double diodes) may also be used.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. Moreover, the foregoing materials are provided by way of example as they represent the materials used in photoconductors. It will be appreciated that other semiconducting materials or other materials may be used for the photoconductive material or layer. In addition, any high density material may be used that has a sufficient density and thickness to absorb or convert MV radiation to a sufficient number of high energy photoelectrons to be received by a conversion layer and converted to a sufficient number of free charge carriers for detection by a pixilated array of thin film electronic capacitors and transistors formed on a low density substrate. The present specification and figures are accordingly to be regarded as illustrative rather than restrictive.

What is claimed is:

1. A photodetector comprising:
   a semiconductor conversion layer having a first surface and a second surface disposed opposite the first surface;
   a first electrode coupled to the first surface of the semiconductor conversion layer;
   a second electrode coupled to the second surface of the semiconductor conversion layer;
   a low density substrate coupled to the second electrode opposite the semiconductor conversion layer, the low density substrate including a detector array;
   a high density layer disposed over the first electrode opposite the semiconductor conversion layer;
   a protective layer disposed between the high density layer and the first electrode, wherein the protective layer comprises a material that is non-reactive with the high density layer, wherein the protective layer comprises one of a paralyene C, a polyethylene terephthalate, an acrylic or vinyl polymer that is formed from a material including the acrylic or vinyl polymer, toluene and methyl ethyl ketone, and an acrylic to protect one of the semiconductor conversion layer, the first electrode, the second electrode, and the substrate from damage due to one of air, humidity, and corrosion;
   wherein the high density layer includes a thickness of a high density material to create a number of photoelectrons caused by mega-voltage x-ray photons incident upon the high density layer, the photoelectrons to be received by the semiconductor conversion layer;
   wherein the first electrode includes a thickness of another high density material to create a number of photoelectrons caused by mega-voltage x-ray photons incident upon the first electrode to be received by the semiconductor conversion layer;
   wherein the semiconductor conversion layer includes a thickness of a photo-conductive material to convert photoelectrons received from one of the high density layer and the first electrode to free charge carriers for detection by the detector array, wherein detected free charge carriers provide an image, and
   wherein the low density substrate has a density and thickness so that mega-voltage x-ray photons incident upon the low density substrate create no more than an insubstantial amount of photoelectrons to be converted by the semiconductor conversion layer.

2. The photodetector of claim 1, wherein the detector array comprises: a plurality of pixels, each pixel comprising a pixel electrode coupled to a thin film capacitor; and wherein the low density substrate comprises one of a glass material and a plastic material.

3. The photodetector of claim 1, wherein the high density layer comprises a sufficient thickness of the high density material to reduce detection of scattered mega-voltage x-ray photons from a subject object due to a longer path length of the scattered photons in the high density layer as compared to detection of unscattered mega-voltage x-ray photons from the subject object due to a shorter path length of the unscattered photons in the high density layer.

4. The photodetector of claim 1, wherein the protective layer has a thickness of between 0.1 and 10 microns.

5. The photodetector of claim 1, wherein the high density layer comprises:
   a thickness of between 0.1 and 10 millimeters.

6. The photodetector of claim 1, wherein the high density layer comprises one of copper, lead, tungsten, tantalum, iridium, a leaded glass, a leaded plastic, and an alloy thereof.

7. The photodetector of claim 1, wherein the high density layer comprises: a plurality of layers.

8. The photodetector of claim 1, wherein the high density layer comprises: a thickness of between 0.5 and 1.5 millimeters of one of lead, copper, a lead alloy, and a copper alloy.

9. The photodetector of claim 1, wherein the first electrode is a continuous upper conducting electrode covering the first surface of the semiconductor conversion layer.

10. The photodetector of claim 9, wherein the continuous upper conducting electrode comprises: one of palladium, platinum, carbon, gold, copper, aluminum, and an alloy thereof having a thickness of between 0.1 and 1000 microns.

11. The photodetector of claim 9, wherein the continuous upper conducting electrode is coupled to a voltage generator to place a voltage bias between the semiconductor conversion layer and the second electrode.

12. The photodetector of claim 9, wherein the continuous upper conducting electrode comprises:
   a thickness of conductive material to produce high energy photoelectrons from mega-voltage x-ray photons incident upon the continuous upper conducting electrode, the photoelectrons having sufficient energy to generate a sufficient number of free charge carriers in the semiconductor conversion layer for detection by the detector array.

13. The photodetector of claim 1, wherein the semiconductor conversion layer is a photoconductive layer having a thickness of between 50 and 2000 microns of one of mercuric iodide ($HgI_2$), lead iodide ($PbI_2$), bismuth triodide ($BiI_3$), amorphous selenium, and thallium bromide (TlBr).

14. The photodetector of claim 13, wherein the photoconductive layer is a wide band gap photoconductive material having a sufficient thickness to generate a sufficient number of free charge carriers from high energy photoelectrons received from one of the high density layer and the first electrode to be detected by the detector array.

15. The photodetector of claim 1, wherein the second electrode comprises: an upper pixilated electrode having a plurality of pixels of conductive material, each pixel coupled to a voltage generator to generate a voltage bias between the pixel and one of the first electrode and the high density layer.

16. The photodetector of claim 15, wherein the first electrode is a continuous upper conducting electrode over the plurality of pixels, and the low density substrate comprises an array of pixilated electronic switches and capacitors having a plurality of detection pixels, each detection pixel comprising a switch and a capacitor, and associated with each pixel of the pixilated electrode.

17. The photodetector of claim 16, wherein the detector array comprises: analog to digital converters to create a digital image file from free charge carriers collected by the capacitors from the semiconductor conversion layer and switched to the analog to digital converters.

18. The photodetector of claim 1, wherein the high density layer and the first electrode are combinatorially configured to convert 0.25-20% of mega-voltage x-ray photons incident upon the photodetector to free charge carriers.

19. The photodetector of claim 1, wherein the high density layer, the first electrode, and the protective layer are combinatorially configured to convert 0.25-20% of mega-voltage x-ray photons incident upon the photodetector to free charge carriers.

20. The photodetector of claim 1, wherein the high density layer comprises a density between 5 and 20 $g/cm^3$.

21. The photodetector of claim 1, wherein the first electrode is adhered to the semiconductor conversion layer.

22. The photodetector of claim 1, wherein the low density substrate has a density selected to allow a majority of mega-voltage x-ray photons to pass through the low density substrate.

23. The photodetector of claim 1, wherein the low density substrate has a density of between 0.1 and 8 $g/cm^3$.

24. The photodetector of claim 1, wherein the high density layer and the first electrode are combinatorially configured to convert between 1 and 2% of incident mega-voltage x-ray photons to high energy photoelectrons for conversion by the semiconductor conversion layer to free charge carriers.

25. The photodetector of claim 1, wherein the semiconductor conversion layer is a single continuous layer of semiconductor material.

26. The photodetector of claim 1, wherein the high density layer is touching the protective layer.

* * * * *